(12) United States Patent
Trussell

(10) Patent No.: US 9,409,249 B1
(45) Date of Patent: Aug. 9, 2016

(54) WELDING ASSISTANCE SYSTEMS

(71) Applicant: Christopher Bryan Trussell, Edgewood, TX (US)

(72) Inventor: Christopher Bryan Trussell, Edgewood, TX (US)

(*) Notice: Subject to any disclaimer, the term of this patent is extended or adjusted under 35 U.S.C. 154(b) by 657 days.

(21) Appl. No.: 13/668,041

(22) Filed: Nov. 2, 2012

Related U.S. Application Data

(60) Provisional application No. 61/588,628, filed on Jan. 19, 2012.

(51) Int. Cl.
*B23K 9/025* (2006.01)
*B23K 9/028* (2006.01)

(52) U.S. Cl.
CPC .............. *B23K 9/0253* (2013.01); *B23K 9/0286* (2013.01)

(58) Field of Classification Search
CPC ... B23K 9/0253; B23K 9/0282; B23K 9/0286
USPC ........................................ 219/60 R; 228/49.3
See application file for complete search history.

(56) References Cited

U.S. PATENT DOCUMENTS

| | | | |
|---|---|---|---|
| 1,071,289 A | 8/1913 | Bader | |
| 3,772,753 A * | 11/1973 | Sargeant | B23K 9/0282 228/48 |
| 4,516,308 A | 5/1985 | Urban | |
| 4,541,621 A * | 9/1985 | Amos | B23K 37/0536 269/43 |
| 4,577,089 A * | 3/1986 | Olson | B23K 7/102 219/124.22 |
| 5,082,037 A * | 1/1992 | Hammons | B60R 9/06 144/286.1 |
| 5,124,533 A | 6/1992 | Dommer et al. | |
| 5,385,280 A * | 1/1995 | Littlepage | B60R 9/06 224/521 |
| D365,114 S | 12/1995 | Walker | |
| 5,660,317 A | 8/1997 | Singer et al. | |
| 5,732,455 A | 3/1998 | Diede | |
| 6,511,088 B2 | 1/2003 | Kahlstorf | |
| 6,638,130 B2 | 10/2003 | Wilbur, Jr. | |
| 6,648,318 B1 | 11/2003 | Oetlinger et al. | |
| 6,765,173 B2 | 7/2004 | Suzuki | |
| 6,860,475 B2 | 3/2005 | Wong | |
| 7,172,105 B2 * | 2/2007 | Maes | B23K 37/04 228/47.1 |
| 7,367,487 B2 | 5/2008 | Murakawa et al. | |
| 7,398,965 B2 | 7/2008 | Glaser et al. | |
| 2002/0008364 A1 * | 1/2002 | Kahlstorf | B60D 1/075 280/515 |
| 2005/0092213 A1 | 5/2005 | Wilson et al. | |
| 2005/0218189 A1 * | 10/2005 | Maes | B23K 37/04 228/47.1 |
| 2006/0151572 A1 | 7/2006 | Yamaoka et al. | |
| 2008/0231029 A1 | 9/2008 | Hummel | |
| 2012/0248071 A1 | 10/2012 | Ikoma | |

OTHER PUBLICATIONS

Javelin Industrial, Portable Fabrication Station, Internet website, copyright 2012, date of publication unknown.

* cited by examiner

*Primary Examiner* — Dana Ross
*Assistant Examiner* — Kuangyue Chen
(74) *Attorney, Agent, or Firm* — Volk & McElroy, LLP; Michael D. Volk, Jr.

(57) ABSTRACT

Welding assistance systems to rotate a piping system component for welding purposes. The welding assistance systems hereof permit pivoting of the item to be welded, leveling of the item to be welded, and electrical conduction prevention to protect items connected with the welding assistance system hereof.

18 Claims, 12 Drawing Sheets

WELDING ASSISTANCE SYSTEMS

CROSS-REFERENCE TO RELATED APPLICATIONS

This application claims the benefit of U.S. Provisional Application No. 61/588,628, filed Jan. 19, 2012, the contents of which are incorporated herein by this reference and are not admitted to be prior art with respect to the present invention by the mention in this cross-reference section.

BACKGROUND

The present invention relates to welding assistance systems. More particularly, the present invention relates to welding assistance systems which are useful to position pipe flanges, pipe, and other piping system components for welding purposes. The present invention is useful in the oil and gas industry where piping systems must be fabricated to meet the demands of a particular environment.

OBJECTS AND FEATURES OF THE INVENTION

A primary object and feature of the present invention is to assist in the fabrication of piping systems. A further object and feature of the present invention is to permit rotation of a piping system component during welding. Yet another object and feature of the present invention is to provide a mechanism to assist easy installation of a piping system component such as a pipe flange or a pipe. Another object and feature of the present invention is to provide a welding assistance system that is portable permitting piping system fabrication at a location remote from a workshop. Still another object and feature of the present invention is to provide mechanisms to pivot and level the piping components to be welded (which ensures proper "two-hole" configurations). Yet another object and feature of the present invention is to provide a welding assistance system that is height adjustable. Further still, another object and feature of the present invention is to provide electrical safeguards which give a welder piece of mind when using the system, especially in remote locations.

A further primary object and feature of the present invention is to provide such a system that is efficient and handy. Other objects and features of this invention will become apparent with reference to the following descriptions.

In accordance with a preferred embodiment hereof, this invention provides a welding assistance system comprising a piping system component holder to securely hold one or more piping system components wherein said piping system component holder comprises one or more surface on which a piping system component is held and a shaft extending away from at least one of said one or more surfaces; a receiver for receiving said shaft; wherein said piping system component holder is rotatable within said receiver; wherein said receiver is connected to a pivot component to pivot said piping system component holder between a horizontal orientation and a vertical orientation; and a vehicle attachment system to attach said welding assistance system to a vehicle. Also, it provides such a welding assistance system further comprising a piping system component holder rotation locking device wherein rotation of said piping system component holder may be selectively locked. Additionally, it provides such a welding assistance system further comprising a pivot locker to lock said piping system component holder in a horizontal orientation and a pivot locker release to release said piping system component holder so that said piping system component holder may move to an orientation other than a horizontal orientation. Moreover, it provides such a welding assistance system further comprising a pitch adjuster to adjust the pitch of said piping system component holder. Also, it provides such a welding assistance system further comprising a ground clamp attachment structure. Additionally, it provides such a welding assistance system further comprising at least one electrical insulator to prevent electrical conduction into components connected with said welding assistance system. Moreover, it provides such a welding assistance system according further comprising a height adjuster to adjust the height of said piping system component holder. Also, it provides such a welding assistance system further comprising a vibration preventer to prevent vibration of said welding assistance system. Additionally, it provides such a welding assistance system further comprising a tray. Moreover, it provides such a welding assistance system further comprising a pipe support adapter, connectable to piping system component holder, to support and position a pipe.

In accordance with another preferred embodiment hereof, this invention provides a welding assistance system comprising a piping system component holder to securely hold one or more piping system components; wherein said piping system component holder comprises one or more surface on which a piping system component is held and a shaft extending away from at least one of said one or more surfaces; a receiver for receiving said shaft; wherein said piping system component holder is rotatable within said receiver; and at least one electrical insulator to prevent electrical conduction into components connected with said welding assistance system. Also it provides such a welding assistance system wherein said receiver is connected to a pivot component to pivot said piping system component holder between a horizontal orientation and a vertical orientation. Additionally it provides such a welding assistance system further comprising a piping system component holder rotation locking device wherein rotation of said piping system component holder may be selectively locked. Moreover it provides such a welding assistance system further comprising a pivot locker to lock said piping system component holder in a horizontal orientation and a pivot locker release to release said piping system component holder so that said piping system component holder may move to an orientation other than a horizontal orientation. Also it provides such a welding assistance system further comprising a pitch adjuster to adjust the pitch of said piping system component holder. Additionally it provides such a welding assistance system further comprising a ground clamp attachment structure. Moreover it provides such a welding assistance system wherein said welding assistance system is connected to a table. Also, it provides such a welding assistance system further comprising a pipe supporter adapter to support attaching a pipe to said piping system component holder.

In accordance with yet another preferred embodiment hereof, this invention provides a welding assistance system comprising a piping system component holder to securely hold one or more piping system components; said piping system component holder having a wheel-shaped portion and a shaft extending away from said wheel-shaped portion wherein said wheel-shaped portion has one or more surfaces on which a piping system component is held and one or more slots to assist in securing a piping system component to said piping system component holder; a pivot assembly having a base member and a pivot member, said pivot member pivotally connected with said base member; wherein said pivot member comprises a receiver structured and arranged to receive said shaft of said piping system component holder; wherein said piping system component holder is rotatable within said receiver; wherein said base member is connected to one or more electrical insulators to prevent electrical conduction into components connected with said welding assistance system; and said one or more electrical insulators connected with a bottom surface of said pivot member. Also, it provides such a welding assistance system further comprising a vehicle attachment system; said vehicle attachment system comprising a height adjustment member and a vehicle hitch connection member; said height adjustment member comprising an upper plate and a tubular member extending downward therefrom; said tubular member comprising one or more height adjustment apertures; said vehicle hitch connection member comprising a vehicle hitch male member structured and arranged to connect with a vehicle hitch and a sleeve member to receive said tubular member of said height adjustment member; wherein said tubular member of said height adjustment member slidingly engages said sleeve member; wherein said sleeve member comprises an upper portion and a bottom portion and at least one aperture associated with said upper portion and at least one aperture associated with said bottom portion; wherein said at least one aperture associated with said upper portion is spaced a first distance from said central portion and said at least one aperture associated with said bottom portion is spaced a second distance from said central portion; wherein said first distance and said second distance are different.

This invention also provides each and every novel feature, element, combination, step.

DETAILED DESCRIPTION OF THE BEST MODES AND PREFERRED EMBODIMENTS OF THE INVENTION

Figure 1:
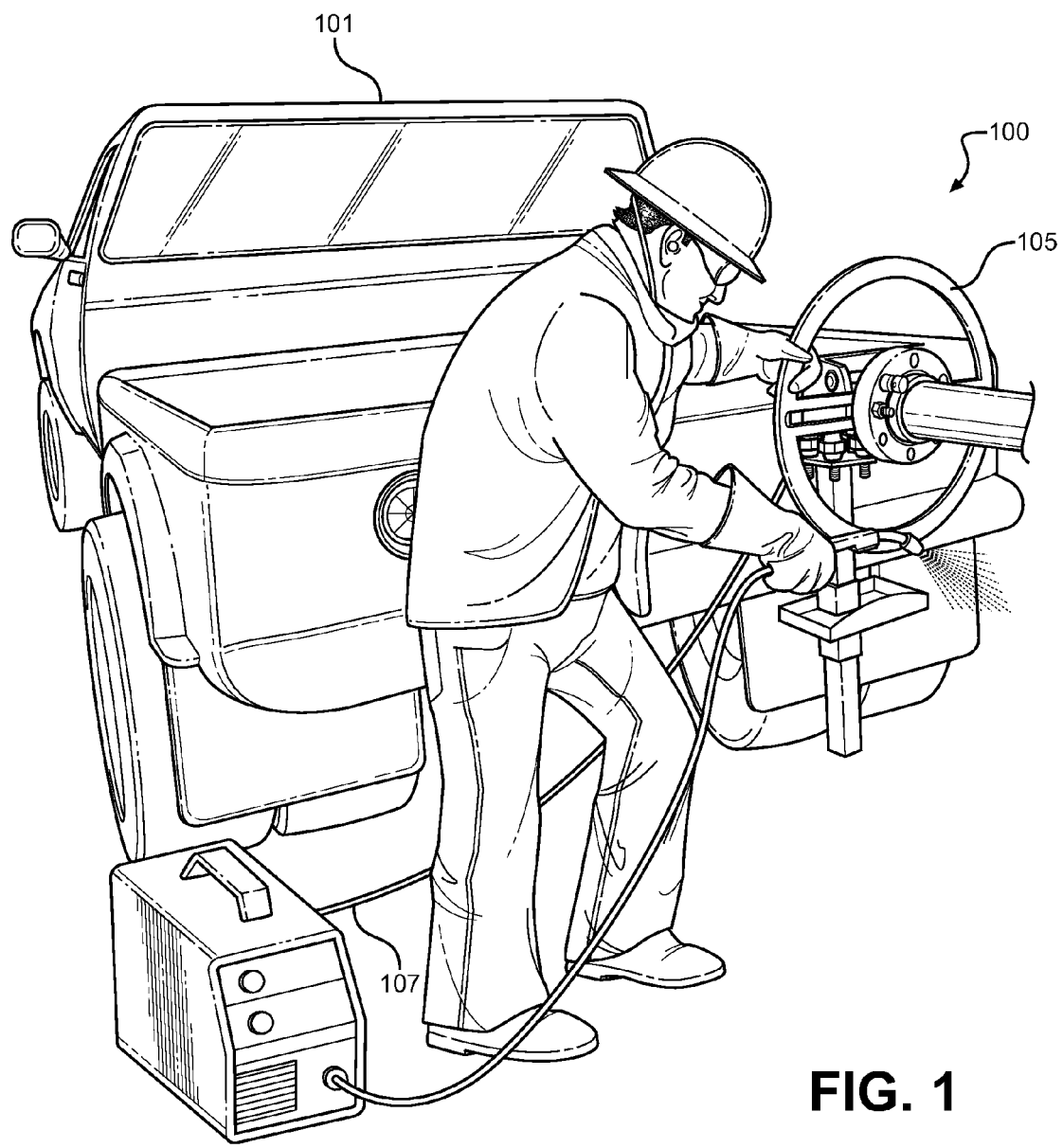
FIG. 1 shows a perspective view illustrating a welding assistance system according to a preferred embodiment of the present invention.

FIG. 1 shows a perspective view illustrating a welding assistance system according to a preferred embodiment of the present invention. The welding assistance system of the present invention provides several features which improve the workability by a welder for convenience and safety.

Primarily, the welding assistance systems of the present invention permit convenient attachment of piping system components, such as, for example, a pipe flange, to a rotatable piping system component holder 105. The welding assistance systems hereof further provide leveling assistance so that the attached piping system components may be leveled appropriately. Additionally, the ability to rotate piping system component holder 105 allows a welder to rotate attached items to effect welding with one hand while holding the electrode holder of an arc welder in a stationary position with the other hand. Since the welder does not have to reposition the electrode holder, the result is a better weld applied to the piping system components. Improved welding is important, for example, in oil and gas field applications to avoid future leakage or breakage problems. Additionally, the welding assistance systems hereof provide much adjustability in both location (i.e., in one or more preferred embodiment, the system is portable) and in height. Also, the system has safety features including components that prevent electrical conductivity into components connected with the system hereof. In one preferred embodiment, the welding assistance system is connected to a vehicle which has an electrical system. By providing electrical insulators between the vehicle and the welding assistance system, the vehicle's electrical system is protected from electric conductivity that may be transferred throughout the welding assistance system.

In a preferred embodiment of the present invention, welding assistance system 100 is preferably connected with vehicle 101, as shown. The vehicle connection permits transport of welding assistance system 100 to various locations for fabrication of piping systems at remote locations, such as in an oil and gas exploration field.

Welding assistance system 100 is used by welders to assist welding primarily tubular components such as piping system components (e.g., pipe flanges and pipes). Piping system component holder 105 securely holds those piping system components to be welded together. The welder rotates piping system component holder 105 and simultaneously holds the electrode of an arc welder at the desired welding location. In this way, the electrode holder does not need to be repositioned to weld the piping components, instead the materials may are rotated through the path of the electrode.

Figure 7:
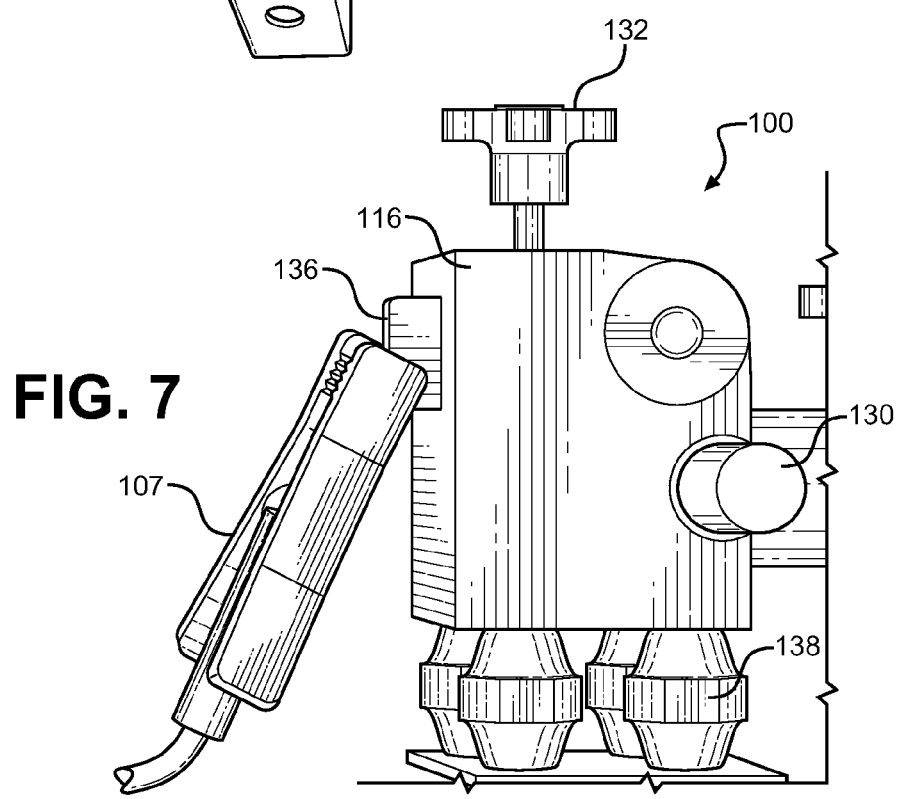
FIG. 7 shows a partial perspective view of the back of the upper portion of the welding assistance system of FIG. 1.

With reference to FIG. 7, welding assistance system 100 includes an attachment for the arc welder's ground clamp. FIG. 1 shows ground cable 107 shown connected to welding assistance system 100. In FIG. 1, the arc welder is shown on the ground. However, in most situations, the arc welder will be stowed on vehicle 101 during use.

Figure 2:
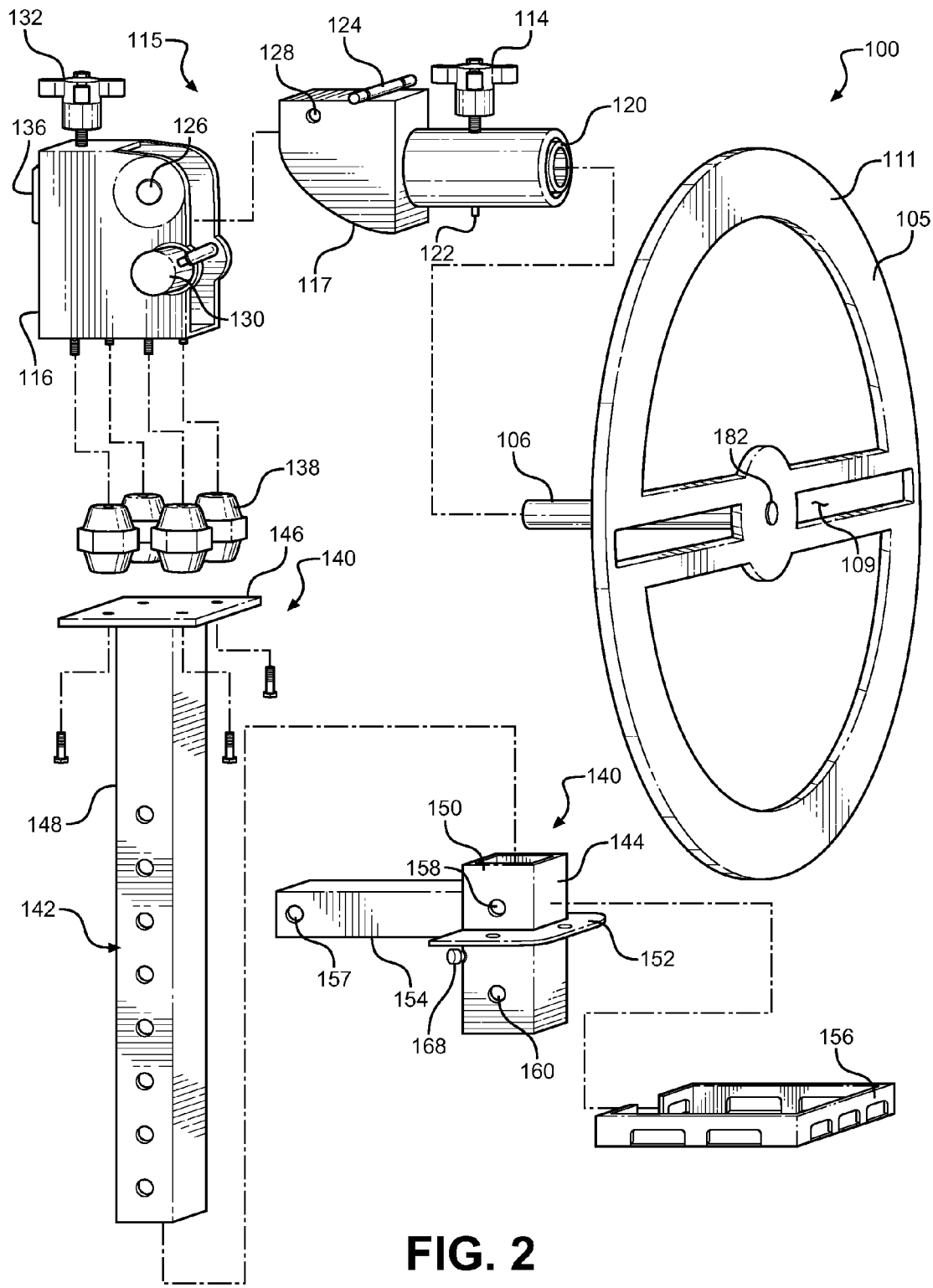
FIG. 2 shows an exploded view of the welding assistance system of FIG. 1 according to a preferred embodiment of the present invention.

FIG. 2 shows an exploded view of the welding assistance system of FIG. 1 according to a preferred embodiment of the present invention.

Welding assistance system 100 preferably comprises piping system component holder 105, as shown. Piping system component holder 105 is preferably wheel-shaped, as shown. The wheel shape is preferred as it provides a surface area that may be easily gripped and rotated with a free hand. Additionally, the circumference of the wheel is preferably larger than the circumference of any attached piping system component so that piping system component holder 105 may be rotated without touching the piping system component pieces being welded. In one preferred embodiment, the diameter of piping system component holder 105 is twenty-one inches. Other diameters of piping system component holder 105 may suffice depending on the application.

Figure 4:
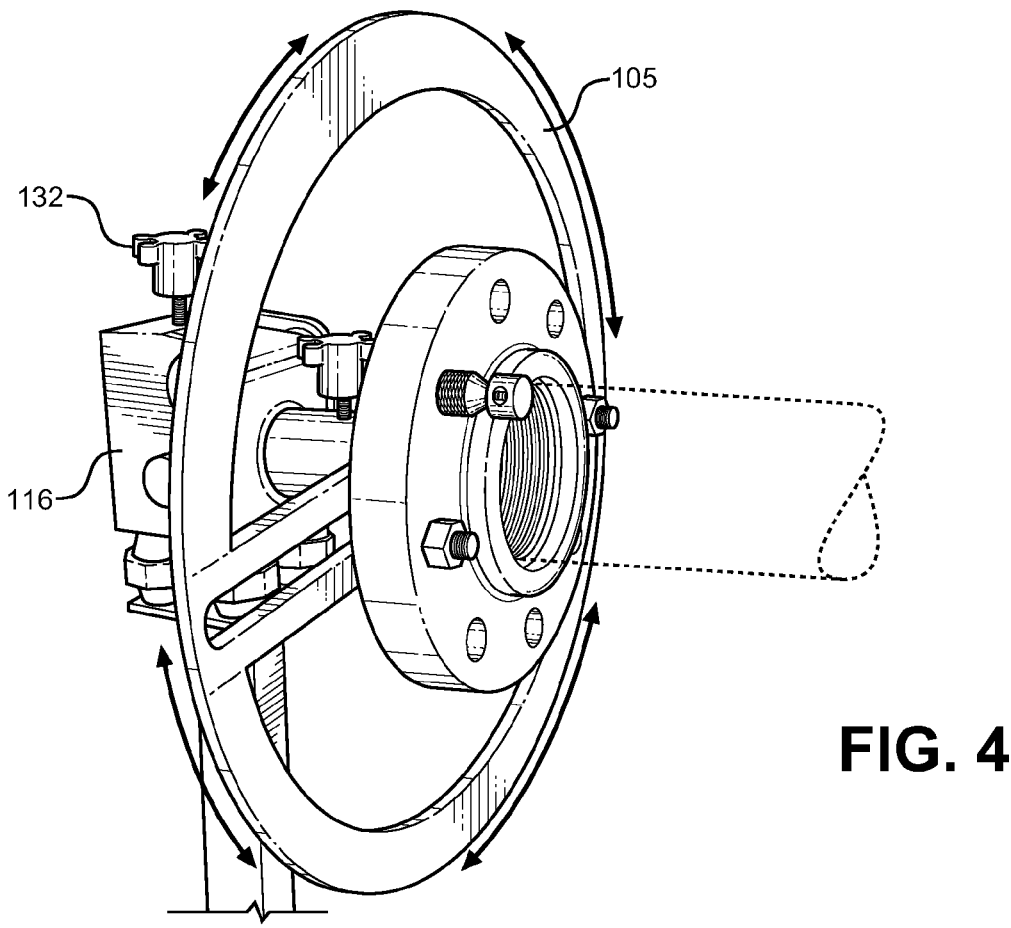
FIG. 4 is a perspective view of the welding assistance system of FIG. 1 illustrating the rotation of the piping system component holder.

Piping system component holder 105 preferably has as arrangement spaces or slots which assist in securing a piping system component to piping system component holder 105. FIG. 4 shows a pipe flange connected to piping system component holder 105. Pipe flanges are, generally speaking, circular and typically have bolt apertures positioned on the outer flange portion of the pipe flange. In constructing piping system in oil and gas fields, it is necessary to construct piping systems with custom shapes. Attaching a pipe to a pipe flange is one common task for welders in oil and gas fields. Using the systems hereof, a pipe flange may be bolted to piping system component holder 105 by passing bolts through the appropriate apertures in the pipe flange and through slots 109 of piping system component holder 105. The bolts are tightened on the opposite surface of the piping system component holder 105 thereby securely holding the pipe flange. With the pipe flange securely held, piping system component holder 105 may spin without risk of having the pipe flange fall.

In a preferred embodiment, piping system component holder 105 has front surface 111 and back surface 112, as shown. A shaft 106 extends away from the back surface 112 of piping system component holder 105, as shown. Shaft 106 fits via a friction fit into bearing hub 120, as shown. The friction fit is one which permits shaft 106 to rotate within bearing hub 120. Bearing hub 120 preferably comprises two bearings 125 at either end of the bearing hub, as shown. The shaft is locked within bearing hub 120 using snap rings 123 (see FIG. 3) positioned outside the bearings 125, as shown. Preferably, shaft 106 contains a groove which, when the groove contacts the snap ring, assists in keeping piping system component holder 105 secured so that it does not slide out of bearing hub 120.

Knobbed setscrew 114, when tightened, exerts force of shaft 106 thereby preventing piping system component holder 105 from rotating. When knobbed setscrew 114 is released, piping system component holder 105 is capable of rotation. A welder will tighten knobbed setscrew 114 when attaching the piping system component to piping system component holder 105 and when leveling the piping system components to be welded. A grease fitting 122 is preferably present on the underside of bearing hub 120 to provide lubrication.

Welding using the systems hereof will generally be performed with front surface 111 of wheel in a vertical orientation (the orientation shown in FIG. 1). However, it is inefficient to attach a heavy item—such as a pipe flange—with front surface 111 in a vertical orientation. Pivot assembly 115 allows piping system component holder 105 to be pivoted in various orientations.

Pivot assembly 115 preferably comprises base member 116 and pivot member 117 connected via a pivot arrangement, as shown.

Pivot member 117 is preferably connected to bearing hub 120, as shown. Pivot member 117 further comprises pin 124 which connects to pivot connector 126 (preferably comprised of bearings) of base member 116, as shown. Pivot member 117 also comprises aperture 128 which engages twist lock plunger pin 130 when piping system component holder 105 is pivoted upwards into a horizontal orientation as shown in dotted lines in FIG. 5. Twist lock plunger pin 130 is used as a pivot locker to lock piping system component holder 105 in a horizontal orientation. Twist lock plunger pin 130 comprises a pivot locker release that disengages twist lock plunger pin 130 from aperture 128 so that said piping system component holder 105 may move to an orientation other than a horizontal orientation. Under appropriate circumstances, other positions and/or numbers of apertures in pivot member 117 may suffice to engage with twist lock plunger pin 130 to lock piping system component holder 105 in a variety of orientations, such as, for example, 45 degrees, 30 degrees, etc.

Base member 116 has knobbed setscrew 132 on the top surface of base member 116, as shown. Knobbed setscrew 132 is used to perform fine adjustment of the pitch of piping system component holder 105. When knobbed setscrew 132 tightened, it pushes down on upper surface 134 of pivot member 117 and pitches the angle of piping system component holder 105 in an upward direction. When knobbed setscrew 132 is loosened, piping system component holder 105 will pitch in a downward angle. This feature is useful when leveling the attached piping system components prior to welding. For example, when leveling a pipe flange using a "two-hole pin" method, two two-hole pins are inserted into two same level pipe flange holes. The two hole-pins typically contain a bubble level. Thus, the pipe flange may be leveled vertically using the bubble levels in the two-hole pins. Additional leveling may be done by using a secondary level that is laid across the two two-hole pins. The pipe flange may now be leveled by turning piping system component holder 105 as shown in FIG. 4 and locking knobbed setscrew 114 when leveling has been achieved.

Base member 116 and pivot member 117 are preferably constructed by welding various plates together. The underside of pivot member 117 may be braced with material spanning the sidewalls to add strength to the system.

Base member 116 preferably comprises grounding lug 136 which is preferably welded to the back of base member 116. Grounding lug 136 is useful to conveniently connect the ground clamp of an arc welder (see FIG. 7).

Figure 3:
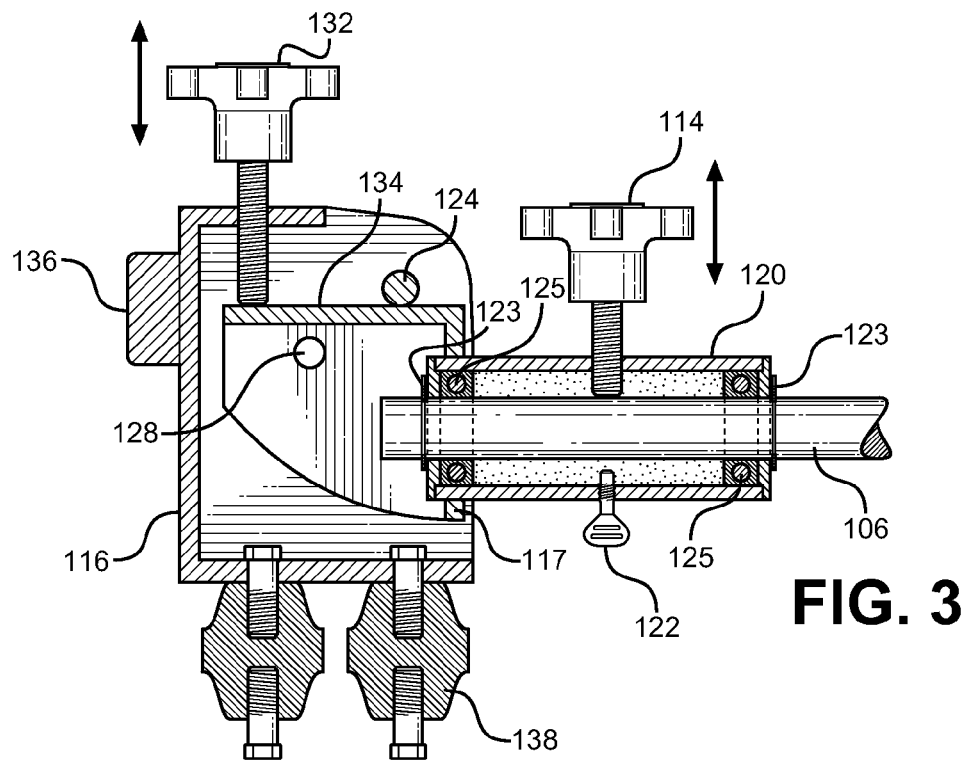
FIG. 3 shows a cross-section of the pivot assembly of the welding assistance system according to a preferred embodiment of the present invention.

Base member 116 is preferably connected with one or more electrical standoff insulators 138. In the preferred embodiment shown in FIG. 2, four electrical standoff insulators 138 are shown. Although four isolators are preferred, other numbers of electrical standoff insulators and configurations may suffice. The electrical standoff insulators 138 are preferably made of fiberglass-reinforced thermo-set polyester. One highly preferred electrical standoff insulator is part number 4200-S6 made available by Storm Copper Components of Decatur, Tenn. With reference to FIG. 3, each electrical standoff insulator has a threaded opening at either end to receive a bolt. The electrical standoff insulators also preferably have a large center post. The remainder of each electrical standoff insulator is preferably solid, as shown.

The electrical standoff insulators protect the components connected to the welding assistance system. FIG. 1 shows welding assistance system 100 connected to vehicle 101. The inventor has determined that placement of electrical standoff insulators in at least the position show in FIG. 2 protects the electrical components of the vehicle from heat and electrical conductivity from the arc welder. Absence of the electrical standoff insulators may result in damage to the vehicle's electrical system.

The bottom surface of base member 116 preferably contains one or more apertures for bolts to pass through and connect with the threaded openings of the electrical standoff insulators (see FIG. 3).

Welding assistance system 100 preferably comprises vehicle mounting assembly 140, as shown in exploded view in FIG. 2. Vehicle mounting assembly 140 has two main components: height adjustment bar 142 and receiver hitch mount 144.

Height adjustment bar 142 preferably comprises top mount plate 146 and a preferably square-shaped tube 148 connected thereto. Square-shaped tube 148 is most preferably square shaped; however, under appropriate circumstances, other shapes, such as circular, triangular, etc., may suffice. Top mount plate 146 preferably comprises apertures through which bolts are passed and connected to the bottom opening of electrical standoff insulators (see FIG. 2 and FIG. 3). Square-shaped tube 148 preferably comprises a number of apertures preferably sized to receive a steel pin to lock height adjustment bar 142 at a desired height.

Receiver hitch mount 144 preferably comprises sleeve 150 for passage of height adjustment bar 142, tray flange 152, and male receiver hitch connector 154. Male receiver hitch connector 154 is preferably square-shaped and sized to fit into a receiver-type vehicle hitch. Male receiver hitch connector 154 comprises aperture 157 which assists in securing receiver hitch mount 144 to a vehicle.

Sleeve 150 is preferably sized to accommodate height adjustment bar 142, as shown. When unsecured, height adjustment bar 142 may slide freely within sleeve 150. Sleeve 150 preferably comprises two distinct apertures, aperture 158 positioned in an upper portion of sleeve 150 and aperture 160 positioned in a bottom portion of sleeve 150, as shown. Aperture 158 and aperture 160 are distinct in that they are positioned at different distances a given central portion of sleeve 150, such as tray flange 152, as shown. By virtue of different spacing of the apertures on sleeve 150, receiver hitch mount 144 can be used in at least two orientations.

Figure 5:
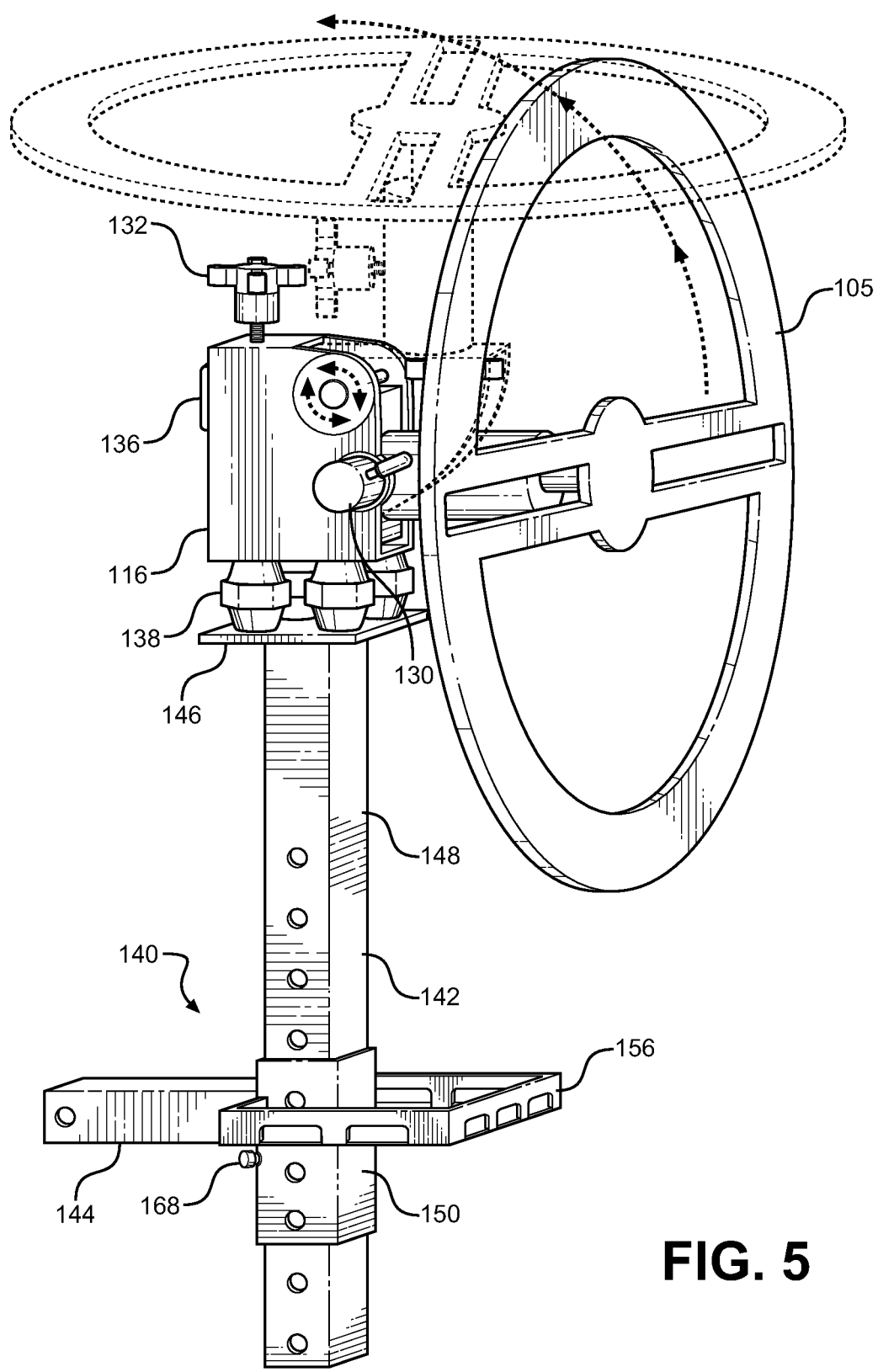
FIG. 5 is a perspective view of the welding assistance system of FIG. 1 illustrating the ability of piping system component holder to pivot.

In the orientation shown in FIG. 5, the aperture spacing in the lower part of sleeve 150 is further from tray flange 152 than the aperture spacing in the upper part of sleeve 150. If receiver hitch mount 144 is rotated 180 degrees, then the aperture spacing in the upper part of sleeve 150 is further from tray flange 152 than the aperture spacing in the lower part of sleeve 150. Thus, it can be seen that receiver hitch mount 144 may be rotated in at least two 180 orientations to provide varying degrees of height adjustment. According to a preferred embodiment of the present invention, the apertures in sleeve 150 are preferably spaced to allow a four-inch height adjustment in one orientation of sleeve 150 and a two-inch height adjustment for the other orientation. It is noted that other aperture distances may suffice. Additionally, other configurations may be possible such as having additional tube components arranged in an orthogonal orientation relative to sleeve 150. Additionally, other shapes of the male receiver hitch connector 154 may suffice, so long as they are held securely within receiver tube mount.

The variable height adjustment feature is useful for multiple users who may be different heights. Also, the remote terrain may affect how a user wishes to adjust the height of the system. Additionally, the piping system to be configured may require choosing one height adjustment orientation over another.

Welding assistance system 100 preferably comprises tray 156, as shown. Tray 156 is preferably connected to tray flange 152 with one or more bolts (see FIG. 6). Tray 156 conveniently holds bolts, levels, spacing bands, and any other tools used in pipe fabrication. The tray has a designated area suited for holding two-hole pins. Tray 156 may be removed and may be used with sleeve 150 in either orientation mentioned above by unbolting tray 156 from the tray flange 152, rotating receiver hitch mount 144 by 180 degrees, and bolting tray 156 back to tray flange 156.

Male receiver hitch connector 154 is structured and arranged to slide within a vehicle receiver-type hitch. Male receiver hitch connector 154 comprises aperture 157 which assists in securing welding assistance system 100 to vehicle 101 when used in conjunction with the vehicle's receiver-type hitch aperture. It is noted that a receiver-type hitch may also be connected with a structure such as a table. In such a preferred embodiment, male receiver hitch connector 154 would be inserted into the table-mounted receiver-type hitch.

FIG. 3 shows a cross-section of the pivot assembly of the welding assistance system according to a preferred embodiment of the present invention. FIG. 3 further illustrates that knobbed setscrew 114 and knobbed set screw 132 may be adjusted (i.e., tightened and/or loosened). As discussed above, knobbed setscrew 114, when tightened, presses against shaft 106 of piping system component holder 105. When so tightened, piping system component holder 105 is locked in place and prevented from rotating. A welder will typically lock rotation of piping system component holder 105 when attaching the piping system component or when leveling an attached piping system component. Also as discussed above, knobbed setscrew 132 may be tightened or loosened to level a piping system component attached to piping system component holder 105. When knobbed setscrew 132 is tightened, the top surface of pivot member 117 is pushed down tilt towards an upward direction. When knobbed setscrew 132 is loosened, force is released from the top surface of pivot member 117. As the force is released, pivot member 117 will tilt in the opposite direction.

FIG. 3 further shows the interior of bearing hub 120 which preferably includes bearings 125 positioned at either end of bearing hub 120 with snap rings 123 assisting securing shaft 106 of piping system component holder 105 in place.

Figure 15:
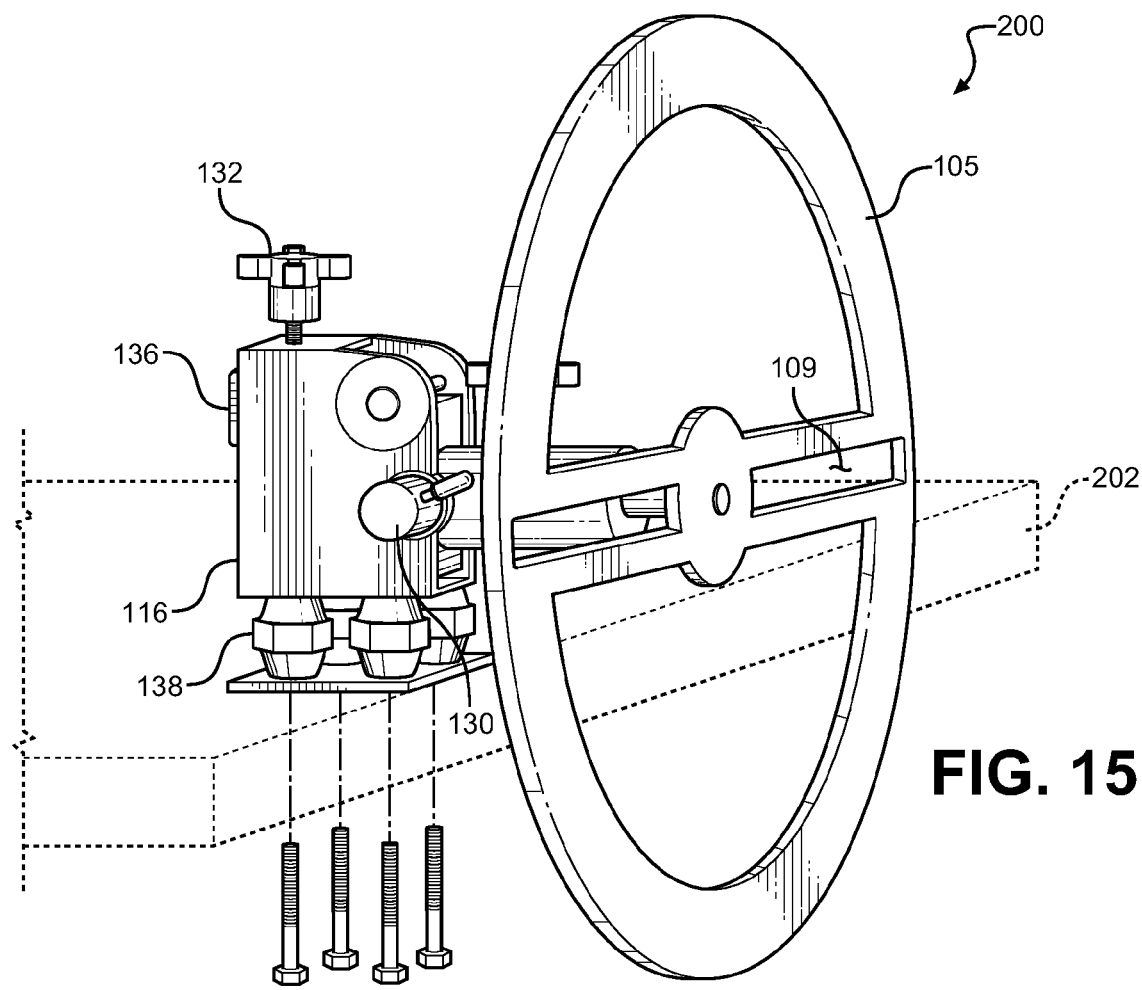
FIG. 15 shows a perspective view of an alternative embodiment of the welding assistance system according to another preferred embodiment of the present invention.

FIG. 3 also shows the cross section of electrical standoff insulators 138. Electrical standoff insulators 138 insulators are mostly solid but have threaded openings at either end for attachment to base member 116 and top mount plate 146 (or to a surface, such as a table, as shown in FIG. 15).

FIG. 4 is a perspective view of the welding assistance system of FIG. 1 illustrating the rotation of piping system component holder 105. Piping system component holder 105 may freely move in either direction when knobbed setscrew 114 is not clamping down on shaft 106 of piping system component holder 105. A pipe flange is shown bolted to piping system component holder 105. A pipe is shown in dotted lines to illustrate connection to the pipe flange. A welder will temporarily attach the pipe to the pipe flange and then rotate piping system component holder 105 while contacting the desired welding joint with the arc welder. As stated above, the advantage is that the material to be welded may be passed through the electrode holder of the arc welder rather than repositioning the electrode holder around the piece to be welded. With tubular pieces, such as pipes and pipe flanges, rotating the joint through the path of the electrode holder will give a more uniform weld. Using such an improved welding technique will produce more robust piping systems.

FIG. 5 is a perspective view of the welding assistance system of FIG. 1 illustrating the ability of piping system component holder 105 to pivot. With reference to FIGS. 2 and 5, piping system component holder 105 preferably pivots about pivot point located at pivot connector 126 (see FIG. 2), as shown. Piping system component holder 105 can be oriented in a vertical orientation and a horizontal orientation (shown in dotted lines). When tilting piping system component holder 105 upward, and to its maximum position, twist lock plunger pin 130 engages aperture 128 in pivot member 117 locking piping system component holder 105 in the horizontal orientation shown in dotted lines. To release piping system component holder 105 from its locked position, the release on twist lock plunger pin 130 is actuated disengaging twist lock plunger pin 130 from aperture 128. Once disengaged, piping system component holder 105 can be swung down into the vertical position shown.

During welding, the welder may lock piping system component holder 105 to load and secure a pipe flange or other piping system component onto piping system component holder 105. Additionally, for certain jobs, it may be desired to weld with the piping system component holder 105 in the horizontal position.

Figure 6:
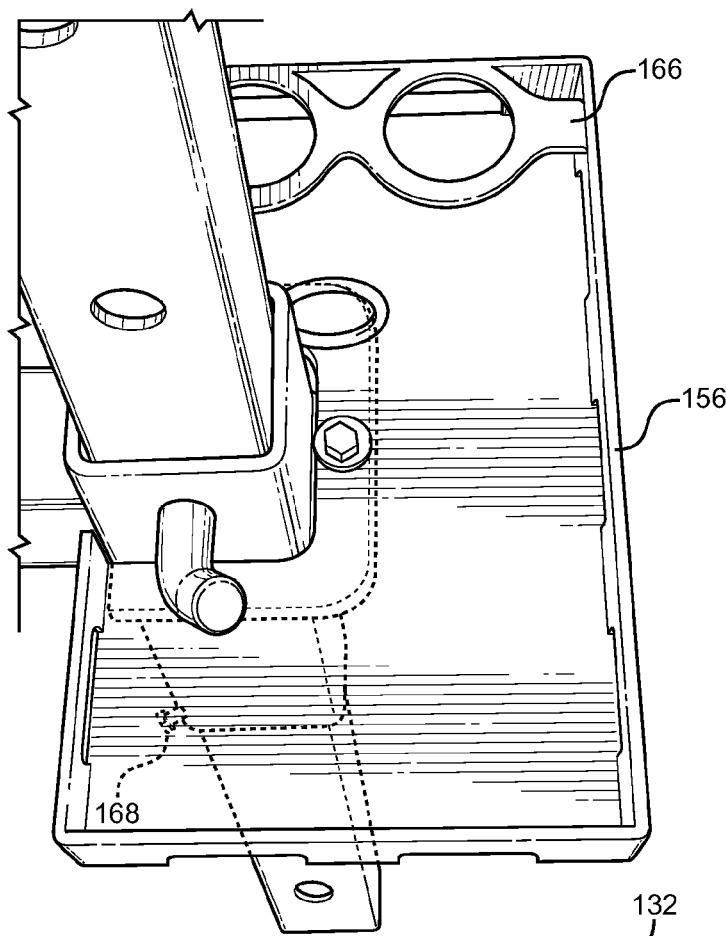
FIG. 6 shows a partial perspective view of the welding assistance system of FIG. 1.

FIG. 6 shows a partial perspective view of the welding assistance system of FIG. 1. FIG. 6 shows tray 156 bolted onto tray flange 152. Tray 156 has raised sidewalls to various items. Preferably, tray 156 has two two-hole pin holders 166 to temporarily stow a set of two-hole pins.

An anti-wobble, or vibration prevention, mechanism is also included which prevents the components of welding assistance system 100 from wobbling or vibrating with welding assistance system 100 attached to a vehicle. In one preferred embodiment, the anti-wobble mechanism comprises bolt 168 which pierces the edge of at least one of the square edges of the bottom mount sleeve 150, as shown. Bolt 168 preferably engages height adjustment bar 142 through sleeve 150 to prevent height adjustment bar 142 or its connected components from wobbling or vibrating.

FIG. 7 shows a partial perspective view of the back of the upper portion of the welding assistance system of FIG. 1. As discussed above, base member 116 preferably has grounding lug 136 welded to the back surface of base member 116. The ground clamp 107 of the arc welder may be conveniently attached to grounding lug 136, as shown.

Figure 8:
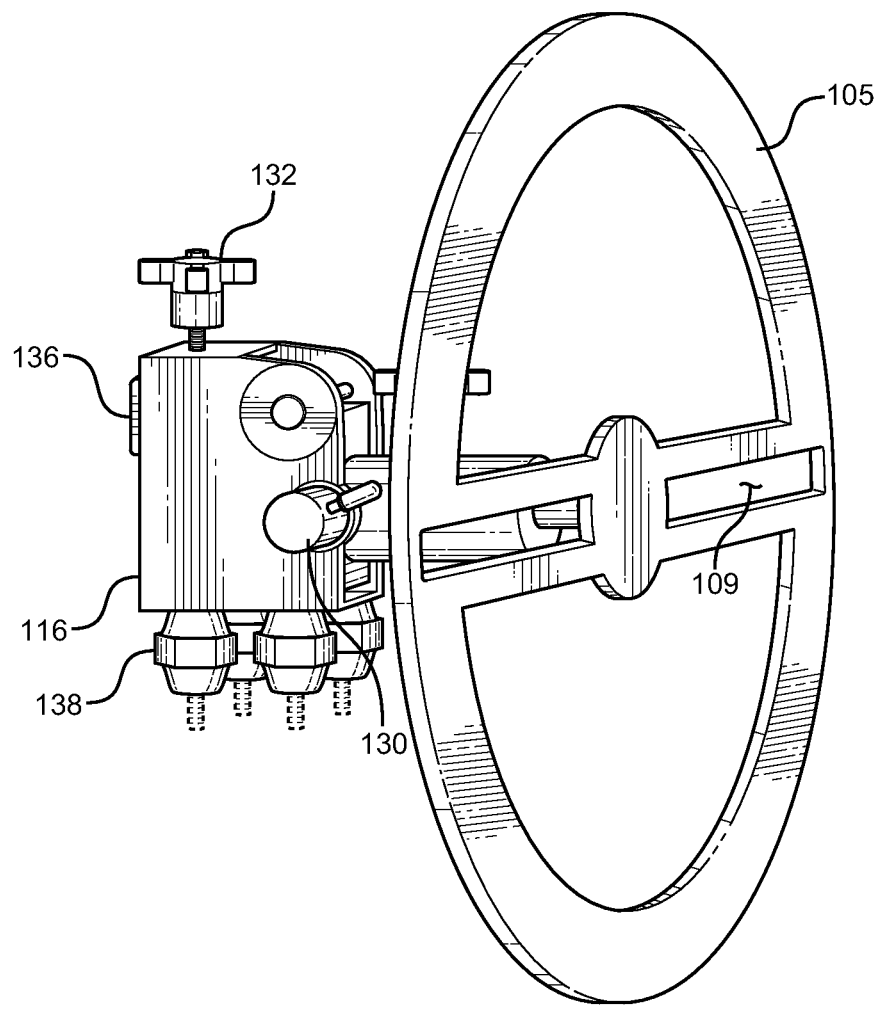
FIG. 8 shows a perspective view of a welding assistance system according to a preferred embodiment of the present invention.
Figure 9:
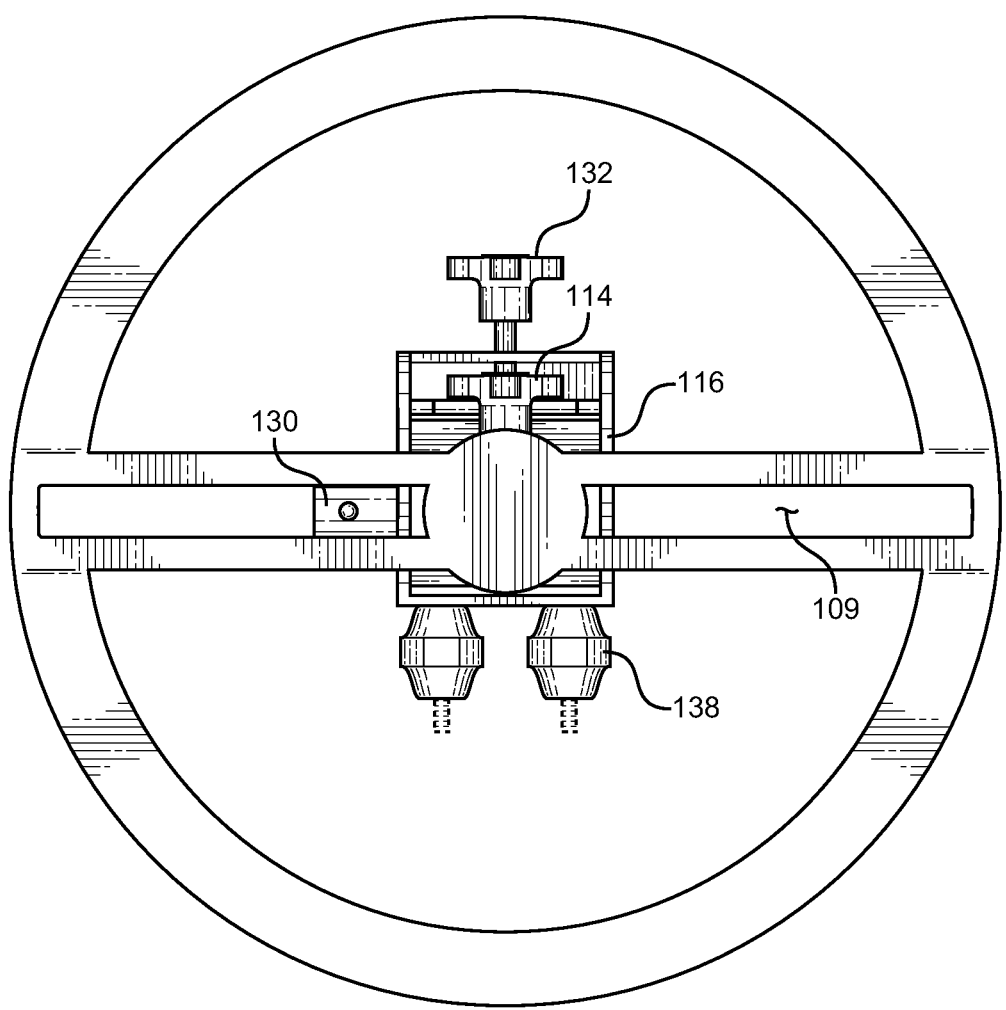
FIG. 9 shows a front view of the welding assistance system of FIG. 8.
Figure 10:
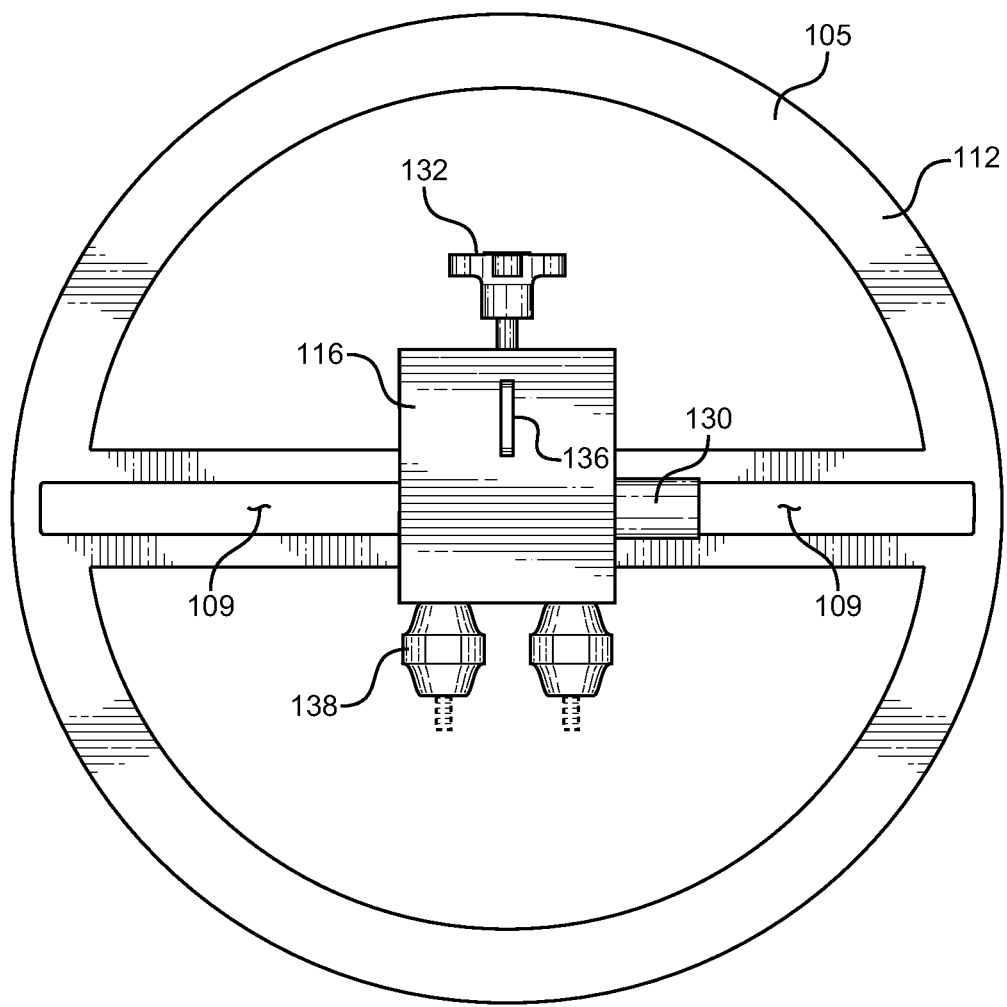
FIG. 10 shows a back view of the welding assistance system of FIG. 8.
Figure 11:
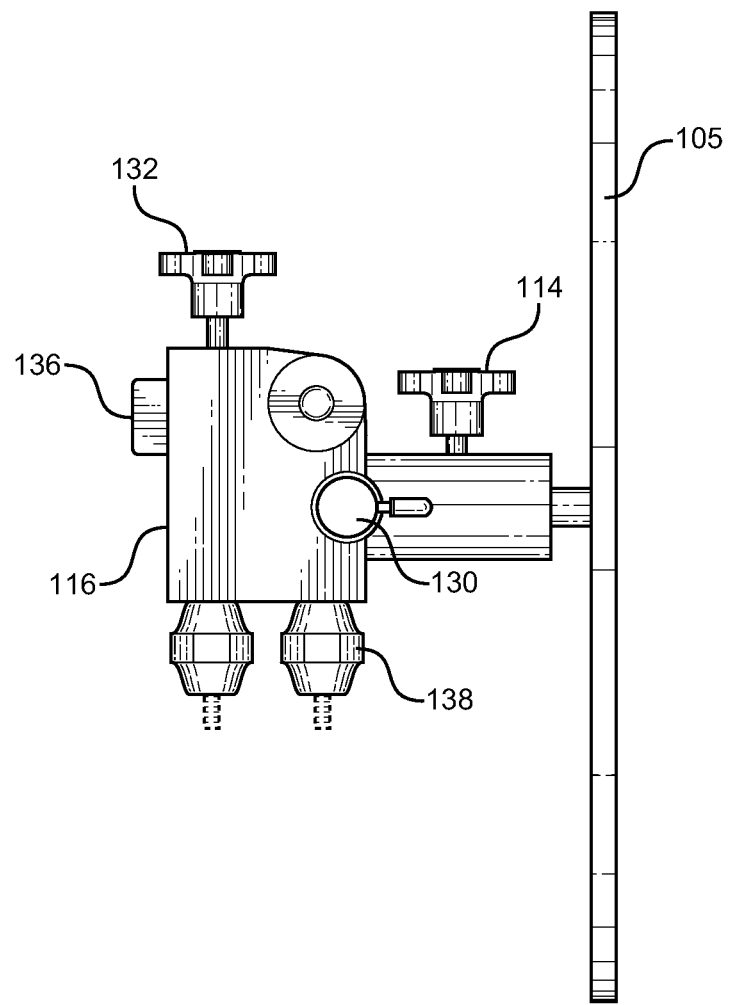
FIG. 11 shows a right side view of the welding assistance system of FIG. 8.
Figure 12:
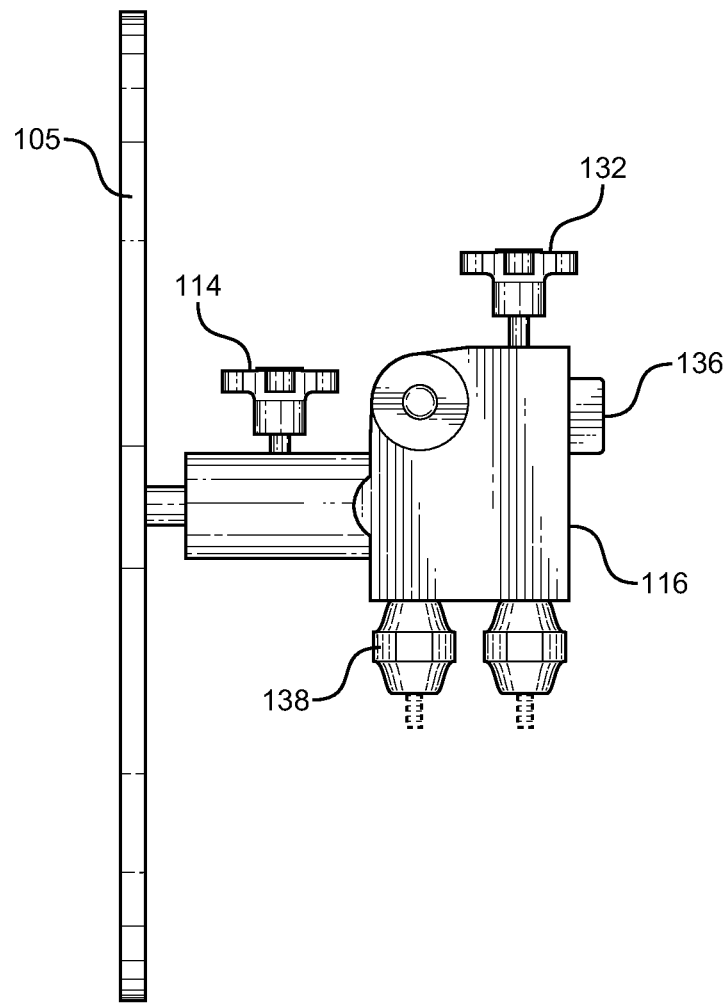
FIG. 12 shows a left side view of the welding assistance system of FIG. 8.
Figure 13:
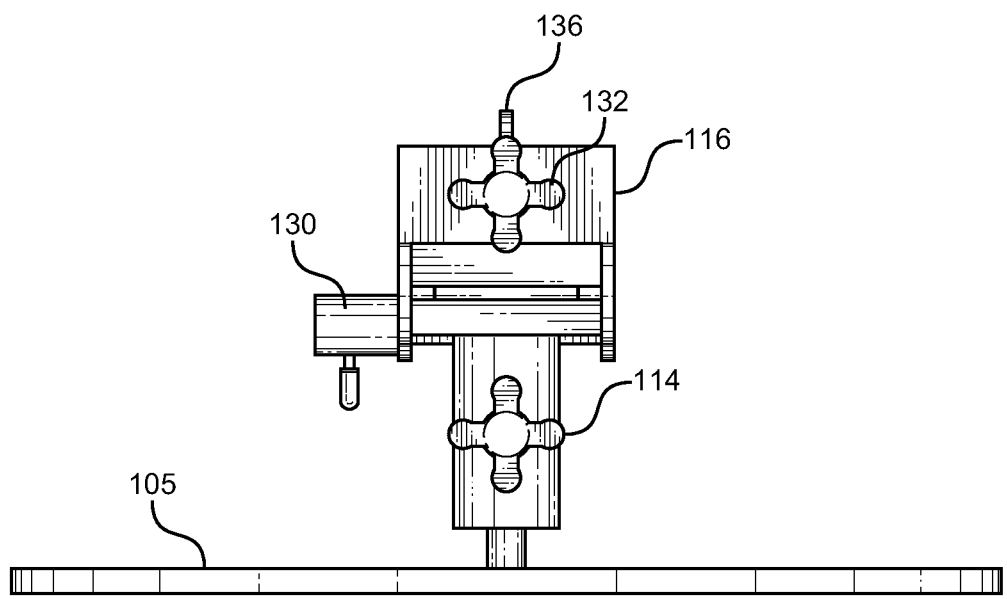
FIG. 13 shows a top view of the welding assistance system of FIG. 8.
Figure 14:
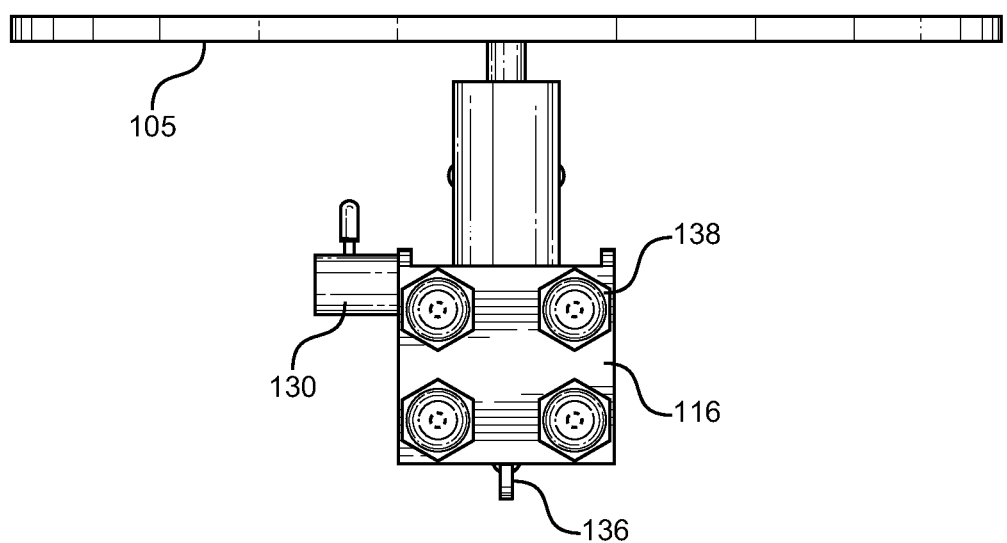
FIG. 14 shows a bottom view of the welding assistance system of FIG. 8.

FIG. 8 shows a perspective view of a welding assistance system according to a preferred embodiment of the present invention. FIG. 9 shows a front view of the welding assistance system of FIG. 8. FIG. 10 shows a back view of the welding assistance system of FIG. 8. FIG. 11 shows a right side view of the welding assistance system of FIG. 8. FIG. 12 shows a left side view of the welding assistance system of FIG. 8. FIG. 13 shows a top view of the welding assistance system of FIG. 8. FIG. 14 shows a bottom view of the welding assistance system of FIG. 8.

FIG. 15 shows a perspective view of an alternative embodiment of the welding assistance system according to another preferred embodiment of the present invention. FIG. 15 shows a welding assistance system 200 which is substantially similar to welding assistance system 100 except that welding assistance system 200 is attached to surface 202. In one preferred embodiment, surface 202 is a table. The remaining portions of the welding assistance system 200 function as previously described with respect to welding assistance system 100. Welding assistance system 200 is preferably secured to surface 202 using bolts, as shown.

Figure 16:
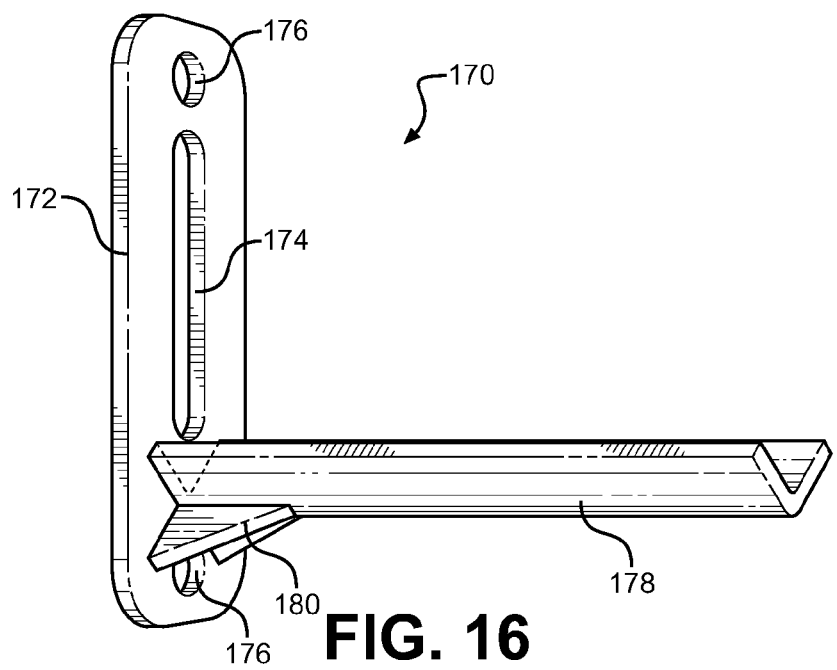
FIG. 16 shows a perspective view of pipe adapter according to a preferred embodiment of the present invention.

FIG. 16 shows a perspective view of pipe adapter 170 according to a preferred embodiment of the present invention. Pipe adapter 170 preferably comprises plate 172 with central slot 174 and two apertures 176. Pipe support 178 extends outwardly from one end of pipe adapter 170, as shown. In the preferred embodiment shown in FIG. 16, pipe support 178 is preferably "V-shaped" and forms a support for tubular pipes.

Structural bracing 180 may be added to provide added strength to pipe support 178 in its cantilevered state, as shown.

To use the pipe adapter 170, bolts are passed through apertures 176 of pipe adapter 170 and through slots 109 in piping system component holder 105. The bolts secure the pipe adapter to piping system component holder 105. In one preferred embodiment, piping system component holder 105 comprises pipe adapter guide 182, as shown in FIG. 1. According to a preferred embodiment, pipe adapter guide 182 is additional weld material positioned in the center of piping system component holder 105. Pipe adapter guide 182 assists in centering central slot 174 onto piping system component holder 105.

Once pipe adapter 170 is secured to piping system component holder 105, a pipe is place onto pipe support 178. The supported pipe may be chained or otherwise held firmly against pipe support 178. Once pipe is held securely in place, the welding assistance system may be used accordingly.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:
1. A welding assistance system comprising:
 a) a piping system component holder to securely hold at least one piping system component;
 b) said piping system component holder comprising one or more surfaces on which at least one piping system component is held and a shaft extending away from at least one of said one or more surfaces;
 c) a receiver for receiving said shaft of said piping system component holder;
 d) said piping system component holder rotatable within said receiver;
 e) said receiver connected to a pivot assembly that allows a user to pivot said piping system component holder between a horizontal orientation and a vertical orientation;
 f) said pivot assembly comprising a pivot member in a pivotal connection with a base member,
 g) said pivot member comprising
  i) a first plate engaged with said receiver,
  ii) a second plate connected with said first plate, said second plate forming an upper sidewall of said pivot member,
  iii) a third plate connected to said first plate and said second plate forming a left sidewall of said pivot member,
  iv) a fourth plate connected to said first plate and said second plate forming a right sidewall of said pivot member, and
  v) a pin connected with said second plate of said pivot member;
 h) said base member comprising
  i) a bottom plate,
  ii) a rear plate connected with said bottom plate,
  iii) a left plate connected with said bottom plate and said rear plate,
  iv) a right plate connected with said bottom plate and said rear plate, and v) a pivot connector that engages said pin connected with said second plate of said pivot member that permits pivoting said pivot assembly relative to said base member, and vi) said left plate of said base member and said right plate of said base member are positioned outside of said third plate of said pivot member and said fourth plate of said pivot member;

i) said base member comprising an upper plate connected with said rear plate of said base member, said left plate of said base member, and said right plate of said base member; said upper plate positioned above said second plate of said pivot assembly and said upper plate comprising a knobbed setscrew that passes through said upper plate and contacts said second plate of said pivot assembly when said piping system component holder is in a vertical orientation so that when said knobbed setscrew is tightened, said piping system component holder is angled upward to assist leveling said piping system component holder, and when said knobbed setscrew is loosened, said piping system component holder is angled downward to assist leveling said piping system component holder;

j) a mechanism that locks said piping system component holder in a horizontal orientation via structure comprising an aperture on said pivot member that engages a locking pin only when said piping system component holder is moved to a horizontal position and said locking pin must be released before moving said piping system component holder from a horizontal orientation, and, when said locking pin is released, said aperture on said pivot member is not occupied, and said piping system component holder moves freely between a horizontal orientation to a vertical orientation, and said piping system component holder is maintained in a vertical orientation by contact of said knobbed setscrew with said second plate of said pivot assembly, and said piping system component holder is configured to move freely from a vertical orientation to a horizontal orientation by tilting the piping system component holder upward without mechanical interference from said knobbed setscrew even when said knobbed setscrew is tightened.

2. The welding assistance system according to claim 1 further comprising a piping system component holder rotation locking device wherein rotation of said piping system component holder may be selectively locked.

3. The welding assistance system according to claim 1 further comprising a pivot locker to lock said piping system component holder in a horizontal orientation and a pivot locker release to release said piping system component holder so that said piping system component holder may move to an orientation other than a horizontal orientation.

4. The welding assistance system according to claim 1 further comprising a pitch adjuster to adjust the pitch of said piping system component holder.

5. The welding assistance system according to claim 1 further comprising a ground clamp attachment structure.

6. The welding assistance system according to claim 1 further comprising at least one electrical insulator to prevent electrical conduction into components connected with said welding assistance system.

7. The welding assistance system according to claim 1 further comprising a height adjuster to adjust the height of said piping system component holder.

8. The welding assistance system according to claim 1 further comprising a vibration preventer to prevent vibration of said welding assistance system.

9. The welding assistance system according to claim 1 further comprising a tray.

10. The welding assistance system according to claim 1 further comprising a pipe support adapter, connectable to piping system component holder, to support and position a pipe.

11. The welding assistance system according to claim 1 wherein said welding assistance system is connected to a table.

12. The welding assistance system according to claim 1 further comprising a vehicle attachment system to attach said welding assistance system to a vehicle.

13. The welding assistance system according to claim 12, said vehicle attachment system comprising:
a) a height adjustment member and a vehicle hitch connection member;
b) said height adjustment member comprising an upper plate and a tubular member extending downward therefrom;
c) said tubular member comprising one or more height adjustment apertures;
d) said vehicle hitch connection member comprising a vehicle hitch male member structured and arranged to connect with a vehicle hitch and a sleeve member to receive said tubular member of said height adjustment member;
e) wherein said tubular member of said height adjustment member slidingly engages said sleeve member;
f) wherein said sleeve member comprises an upper portion and a bottom portion and a central portion and at least one aperture associated with said upper portion and at least one aperture associated with said bottom portion;
g) wherein said at least one aperture associated with said upper portion is spaced a first distance from said central portion and said at least one aperture associated with said bottom portion is spaced a second distance from said central portion; and
h) wherein said first distance and said second distance are different.

14. The welding assistance system according to claim 1, said piping system component holder comprising a wheel shaped structure having one or more slots.

15. The welding assistance system according to claim 2, said rotation locking device comprising a knobbed setscrew that, when tightened, exerts force on said shaft of said piping system component holder within said receiver preventing rotation of said shaft within said receiver.

16. The welding assistance system according to claim 5 said rear plate of said base member comprising said ground clamp attachment structure.

17. The welding assistance system according to claim 6, said at least one electrical insulator comprising at least one electrical standoff insulator having threaded openings at either end; said bottom plate of said base member comprising at least one aperture; and said at least one electrical standoff insulator is secured to said base member with bolt passing through said at least one aperture of said base member and into a threaded opening of said at least one electrical standoff insulator.

18. The welding assistance system according to claim 10, said pipe support adapter comprising a pipe support adapter plate having a central slot and two apertures situated on opposing ends of said pipe support adapter plate and a V-shaped pipe support extending outwardly from said pipe support adapter plate.

* * * * *